July 14, 1936.    L. WAGNER    2,047,810
JOINING MEANS
Filed June 5, 1934
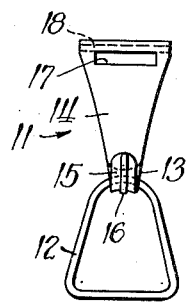
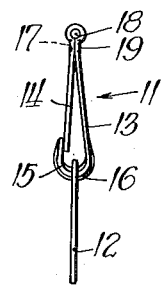
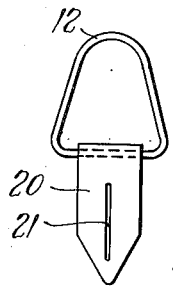
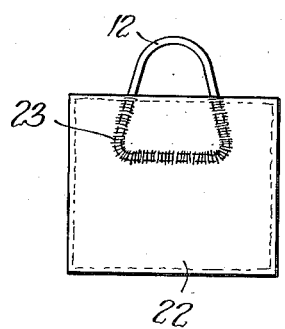
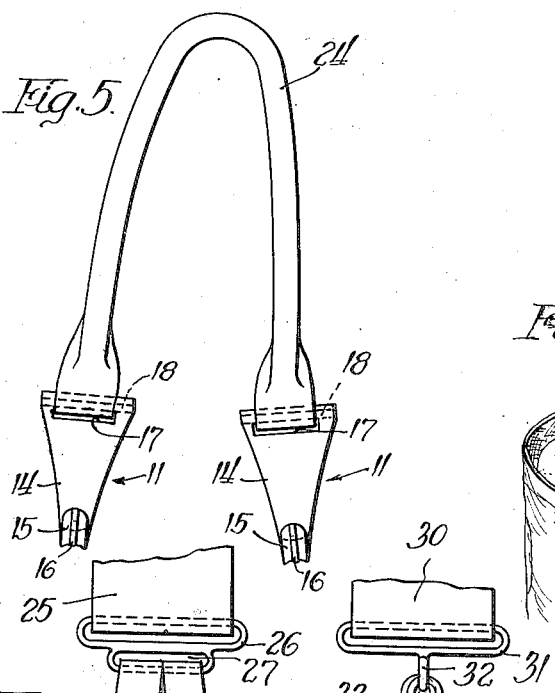
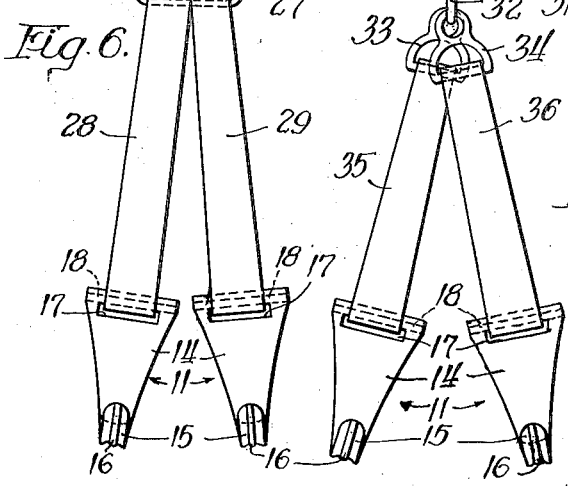
INVENTOR.
Luise Wagner
BY
ATTORNEY.

Patented July 14, 1936

2,047,810

UNITED STATES PATENT OFFICE 2,047,810

JOINING MEANS

Luise Wagner, Chicago, Ill.

Application June 5, 1934, Serial No. 729,120

1 Claim. (Cl. 24—237)

My invention relates broadly speaking to joining and retaining means and is more particularly concerned with novel and improved means for securely fastening or joining certain bodies, for example, joining suspenders with a garment, at the same time allowing free and unrestricted movement between the joined articles.

The invention comprises a locking member which is made in the form of a snap or spring hook of novel and improved construction for cooperating with a simple eyelet or holder member. The locking hook may be secured in a suitable manner to a given article, for example, to the suspenders and the holder may be attached to a companion article, for example, to the trousers. The joining of these bodies or articles may then be easily effected by means of the novel locking hook which can be quickly brought into engagement with the holder member. The two articles are then securely joined and yet the joint is made in such a manner as to permit free and unrestricted movement between the bodies. The disengagement can also be easily effected by separating the locking hook for unlocking the same from engagement with the holder member.

The invention may be applied generally wherever it is desired to obtain a relatively flexible or movable joint between two points and where such joint should be adapted for quick and easy execution as well as disengagement. I have mentioned above suspenders and trousers but it will be understood that the invention is by no means restricted or limited to such use. An example of the type of joint which may be made by the use of my invention resides in the construction of leashes for attachment to collars for handling domestic animals. As intimated above, another example may be found in the construction and operation of suspenders for securing trousers and/or securing and holding other garments, such as stockings and the like. The invention will be particularly described with reference to suspenders and trousers since they afford a good example for illustrating the advantages resulting from the invention and from the various novel features incorporated therein, but it should be distinctly understood that the invention is not limited to such use.

Suspenders are usually secured by means of buttons, fastened to the respective garment, for example, to the trousers. In order to remove the suspenders, it is necessary to unbutton those parts thereof which cooperate with the various buttons. This procedure is objectionable because it consumes time and an amount of labor which is in no proportion to the effect achieved. The buttons break and tear off and require replacement, causing a great deal of annoyance. My invention eliminates and obviates the use of buttons entirely and represents numerous advantages which will appear as the description progresses. The invention is described below with reference to the accompanying drawing in which Figs. 1 and 2 show the novel locking hook and the eyelet cooperating therewith;

Fig. 3 shows the invention incorporated in conjunction with a member having a buttonhole. This particular structure may be considered a make-shift but presents advantages over the structures now in use;

Fig. 4 shows the eyelet or holder member secured to a piece of fabric for ready attachment to a garment;

Figs. 5, 6 and 7 show the novel locking hook in cooperation with three different forms of suspenders; and Fig. 8 shows the invention applied to a garment secured by means of my suspenders equipped with the novel locking means.

Referring now to Figs. 1 and 2, I have provided a novel locking device which is realized in the form of a locking hook or spring hook generally designated in the drawing by the reference numeral 11. This device consists of suitable spring material which is shaped around a supporting and reinforcing pin 18 to form a flat portion 19 in back of the pin. The operating member 14 flares from this flat and substantially rigid portion 19 on one side thereof and the retaining member 13 extends from the flat portion 19 on the other side thereof and coils at the bottom to form the locking portion 15, the end of which overlaps the spring portion 14 in resilient engagement therewith. A reinforcing rib 16 is provided on the lower portion 15 of the device. The spring portion 14 will operate responsive to pressure in the manner of a lock so as to open the closed hook portion of the device at will. It should be observed that the form which I have given to the locking hook is not an accidental one but is premeditated. The upper portion is wide and tapers gradually into the reinforced end portion 15. The latter is internally slightly convex so as to facilitate the lateral motion of the holder member 12 during the use of the device. At the flat portion 19 is provided a slot 17 extending in parallel to the axis of the reinforcing pin 18 for fastening the locking device in a suitable manner to that end of a body or article which is desired to be movably secured to another article or object. The device may be secured, for example, to suspenders as will be discussed later on.

Inserted into the above described locking device is an eyelet or holder member 12 which may be in the form of a closed flat metal ring. The shape shown is reminiscent of a stirrup which is a suitable form for the purpose in view. Other forms may be used if desired. The eyelet or holding member 12 may also be attached in a suitable manner to an object which is desired to be joined with the object carrying the member 11. The engagement of the device 11 with the member 12 may be effected simply by pressing the spring member 14 of the locking hook 11 and inserting the member 12 into engagement as shown. The locking member 14 will then spring back into the position shown in the drawing, firmly locking the eyelet or holder member 12 against accidental displacement. The internally convex form of the hook portion 15 will allow free lateral motion of the companion holder member 12.

Again calling attention to the shape of the locking device 11 in Fig. 1, it will be observed that the companion holder member 12 held by the device 11 is shaped to conform to the general outline of the holder 11. However, whereas the holder 11 is wide at the top and narrow at the bottom end, the member 12, as shown in engagement with the member 11, is narrow at the top and wide at the bottom. The cooperation of these members, due to the shape thereof, will produce an engagement which is secure and firm as well as reliable, at the same time warranting free movement of the two articles thus joined relative to each other. It will, therefore, be seen that the shape which I have given to these members is by no means accidental but facilitates the operation of the device. It will be understood that the form may be changed to suit given conditions.

In Fig. 3 is shown an embodiment which may be of use in such instances where a flexible joint of this type is desired between an article which is provided with buttons. This structure, as mentioned previously, may be considered a makeshift but it has its virtues since it permits the use of my novel suspenders without any alterations of existing trousers. This contingency might occur in the case of trousers already provided with buttons in conjunction with the use of my suspenders of novel construction. The holder 12 may correspond generally to the shape of the holder member shown in Fig. 1 and has a like function. Secured to the holder 12 may be the member 20 provided with a button hole 21. To each button may be attached such a structure as shown in Fig. 3. The suspenders in this case will be provided with locking hooks, such as 11, and each locking hook will cooperate with the corresponding eyelet or holding ring, such as 12, secured to the trousers by means of the extension member 20.

It will be remembered, however, that the important advantage presented by my invention resides exactly in the possibility to eliminate buttons. Therefore, it will be advisable and is contemplated in my invention to provide a structure, such as shown in Fig. 4. This structure comprises a holder member 12 which may be permanently sewed to a piece of fabric 22, as shown at 23 and partially embedded therein. This piece of fabric may consist of suitably folded layers in which the holder 12 is inserted and suitably sewed thereto. The piece of fabric 22 may then be secured to the trousers to replace the buttons. One structure, such as shown in Fig. 4, replaces a button on a garment. The suspenders in this case are again equipped, as above intimated, with locking hooks 11 as shown in Figs. 1 and 2, which hooks will engage the corresponding eyelets or holding member 12.

In Fig. 5 is shown a conventional form of suspender attachment comprising the flexible or semiflexible bridge member 24. To each end of this bridge member which may be formed either of fabric or of leather or the like, may be attached a locking hook of my novel construction and designated in Fig. 1 by the numeral 11. It should be observed that the attachment is made by means of the slot provided in each of the locking hooks, the slots being designated by the reference numeral 17. The structure such as shown in Fig. 5 may be attached to the corresponding portions of the carrier parts of the suspender.

In Fig. 6 is shown a different form of suspender construction in which my invention may also be incorporated. The suspender may consist of a carrier portion 25 which, in this case, is in the form of a ribbon. Carried at the end of this suspender portion is a link 26 having a slot 27. Depending from this slot 27 are carrier members 28 and 29 and at the end of each of these carrier members is attached a locking device or locking hook of my construction and designated in this drawing by the numeral 11. Each of these locking hooks may again cooperate with corresponding eyelet or holding members such as 12 which may be secured to the trousers as explained. The attachment may be made by utilizing the structure shown in Fig. 4 or any other suitable mode of attachment.

Referring now to Fig. 7, this figure illustrates another construction of a suspender in which my invention is incorporated. Secured to the end of the suspender carrier 30 is the link 31 having an eyelet 32. Movably secured to this eyelet may be the holders 33 and 34 and attached to each of these holders and depending therefrom may be the members 35 and 36 corresponding generally to the members 28 and 29 described in conjunction with Fig. 6. At the lower end of each of the members 35 and 36 may be secured a locking device or spring hook 11 of the previously described structure.

Fig. 8 illustrates how the invention may be carried out in practice in conjunction with a garment. The garment may be represented by the trousers indicated in Fig. 8 by the numeral 40. Attached to the garment in the place of the usual buttons may be the eyelets or retaining members 12, the attachment to the garment being accomplished by means of a structure such as shown in Fig. 4 wherein each eyelet or hook 12 is first secured to a piece of fabric 22 and the piece of fabric is then sewed to the garment, as shown in Fig. 8. The suspenders may comprise carrier ribbons, such as 41, 42 and 43. Each of these ribbons may cooperate with a joint or bridge member such as 24 (explained in conjunction with Fig. 5) and to each end of each of these joints or bridges may be secured a locking device 11 for cooperation with the corresponding hook or eyelet 12 which is secured to the trousers as shown. It will be understood, of course, that the locking device 11 may be attached to the suspender ribbons in a different manner, for example, in the manner indicated in Figs. 6 and 7. Other constructions are known and may be used. In fact, any suitable suspender construction may be used in conjunction with my invention.

It will be apparent from the above description that my invention consists primarily in the construction of a novel joint for securely fastening bodies together. The fact that I have illustrated and described my invention in conjunction with specific structures relating chiefly to suspenders is not to be understood as a limitation to the scope of my invention. I have shown specific embodiments and described the specific application thereof merely for the sake of teaching others how to make use of my invention. What is considered new is pointed out in the appended claim and it is understood that I intend to make use of and apply all such structures that might fall within the scope and spirit of this claim.

I claim as my invention:

A unitary snap hook particularly for wearing apparel supporters such as suspenders, consisting of a supporting pin, a single metallic strip member disposed about said pin in intimate engagement therewith and extending therefrom in the form of two sections of unequal length, said sections being disposed immediately adjacent said pin in parallel to each other and in intimate engagement with each other and forming a substantially rigid flat reinforcing portion immediately adjacent said pin, a slot in said flat reinforcing portion disposed in parallel with said pin for securing said hook in conjunction with suspenders, said two sections extending from said flat reinforcing portion at an angle to each other and in resiliently cooperating relation to each other, a central reinforcing rib projecting from the material at the end of one of said sections and integral therewith, said reinforced end of said section forming an open hook, said other section being substantially straight and its end resiliently engaging said open hook from the inside thereof and resiliently closing the same, said hook portion being internally convex for receiving a part of the wearing apparel to be supported and for supporting said part uniformly regardless of lateral displacements thereof within the limits of normal and ordinary wear of said apparel supported by suspenders provided with said hook.

LUISE WAGNER.